(12) United States Patent
Lin et al.

(10) Patent No.: US 10,963,546 B2
(45) Date of Patent: Mar. 30, 2021

(54) BIOMETRIC SECURITY DEVICE

(71) Applicant: SunASIC Technologies, Inc., New Taipei (TW)

(72) Inventors: Chi Chou Lin, New Taipei (TW); Zheng Ping He, New Taipei (TW)

(73) Assignee: SunASIC Technologies, Inc., Taipei (TW)

( * ) Notice: Subject to any disclaimer, the term of this patent is extended or adjusted under 35 U.S.C. 154(b) by 437 days.

(21) Appl. No.: 15/947,956

(22) Filed: Apr. 9, 2018

(65) Prior Publication Data

US 2019/0311097 A1    Oct. 10, 2019

(51) Int. Cl.
*G06F 21/32* (2013.01)
*G06F 21/62* (2013.01)
*G06F 16/23* (2019.01)
*G07C 9/37* (2020.01)

(52) U.S. Cl.
CPC .............. *G06F 21/32* (2013.01); *G06F 16/23* (2019.01); *G06F 21/6218* (2013.01); *G07C 9/37* (2020.01)

(58) Field of Classification Search
CPC ...... G06F 21/32; G06F 21/6218; G06F 21/77; G06F 21/123; H04L 63/0861; G07C 9/37
See application file for complete search history.

*Primary Examiner* — Paul E Callahan
(74) *Attorney, Agent, or Firm* — Demian K. Jackson; Jackson IPG PLLC

(57) ABSTRACT

A biometric security device for digital key storing is disclosed. The biometric security device includes a biometric information fetching module and a processing module. The processing module has a nonvolatile storage unit and a processing unit. The nonvolatile storage unit includes a secure storage unit and a general storage unit. The biometric security device with a secure electronic key designed for storing secret data utilizes both TrustZone™ technology (or similar technology) and biometric authentication. Thus, it can provide the flexibility for multiple users or applications to use the biometric security device or any equipment the biometric security device mounted in without compromising the safeguard of the data stored therein.

21 Claims, 9 Drawing Sheets

BIOMETRIC SECURITY DEVICE

FIELD OF THE INVENTION

The present invention relates to a biometric security device for digital key storing and a method to operate the biometric security device. More particularly, the present invention relates to the biometric security device of a secure digital electronic key storage with biometric authentication and a method to operate the secure digital electronic key storage.

BACKGROUND OF THE INVENTION

The Internet of Things (IoT) impacts the way we interact with the world around us. Billions of "things" are communicating with each other—from TVs, fridges, and cars to smart meters, health monitors and wearables. IoT Security is key to gain and retain consumer trust on privacy and to fulfill the full potential of the IoT promise. Hardware Security Modules (HSMs) are used in safeguarding the most sensitive IoT devices' digital keys which are centrally stored on servers or other systems. Smartphones are popular electronic devices for end-user to store personal digital keys. However, these end-user devices are neither secure enough nor friendly enough for a third-party organization to access the secure environment built therein to use the digital key(s). Actually, many smartphones deny the access of a third-party application to the secure environment. Furthermore, smartphones are not designed for managing multiple users of a single device (such as a connected car, or a smart appliance).

In recent years, ARM™ provided TrustZone™ technology, hardware-based security built into SoCs that provide secure endpoints and a device root of trust. Many smartphones and IoT devices utilize TrustZone™ technology to store digital keys in the trusted environment to improve security thereof. But they only ensure the confidentiality and integrity of digital keys stored therein for attackers that do not have root credentials. Using a Secure Element as key storage in the device may solve the confidentiality and integrity problem, but it is not cost-effective.

U.S. Pat. No. 9,690,916 provides a multi-function identification system including electronic keys. The secret data (digital keys) are stored therein and encrypted using a user's biometric data. The electronic keys may be secure, but all appliance software work with the keys may need to be provided by the system maker, and all appliances and keys need to have the same appliance connector. However, it is unlikely for an ATM appliance, a car, and an electronic lock to have the same appliance connector. Furthermore, while robust security mechanisms are required, one system may have a unique design that the appliance software therein may not be able to fit another system.

To solve the problem mentioned above, a more flexible design of the end-user key-store device is desired. A biometric security device with a secure electronic key designed for storing secret data utilizing both TrustZone™ technology (or similar technology) and biometric authentication can provide the flexibility without compromising the safeguard of the data stored therein.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirement mentioned above, a biometric security device is disclosed. The biometric security device includes: a biometric information fetching module, for fetching biometric information and converting biometric information into a fetched biometric data; and a processing module, having a management software installed therein, configured into two isolated environments: a secure execution environment and a normal execution environment; any instructions and data stored in the secure execution environment cannot be directly accessed from the normal environment or an external device; the processing module comprises: a nonvolatile storage unit, configured into: a secure storage unit, including a biometric database, an application database and instructions of the management software, wherein the biometric database has a plurality of biometric entries; each biometric entry comprises at least one stored biometric data; the application database has a plurality of application entries; each application entry comprises a registered application ID and a secret data; the stored data are accessed only through the management software, so that data stored therein are protected with respect to confidentiality and integrity; and a general storage unit, having registered application software stored therein, wherein each of registered application software has a corresponding registered application ID; and a processing unit, electrically linked to the biometric information fetching module and the nonvolatile storage unit. The management software is executed in the secure execution environment to check if the fetched biometric data matches one of the stored biometric data; the fetched biometric data is stored in the secure execution environment. The processing unit executes a predetermined action in response to one corresponding registered application or initiates one registered application when the fetched biometric data matches any one of the stored biometric data.

According to the present invention, the whole or a portion of the application database may be encrypted when at least one stored biometric data exists, and decrypted when the fetched biometric data matches any one of the stored biometric data. The processing unit may execute the predetermined action in response to one corresponding registered application when the fetched biometric data matches any one of the stored biometric data and an application ID received by the management software matches the registered application ID of the corresponding registered application. The biometric entry further comprises an associated registered application ID or an associated application entry of one registered application. The processing unit may initiate one registered application when the fetched biometric data matches a specific stored biometric data which is stored with the associated registered application ID or the associated application entry of said registered application in the biometric entry. A portion of the application database may be associated with one of the biometric entries and the portion of the application database may be decrypted when the fetched biometric data matches the stored biometric data of the biometric entry.

The management software may further communicate with the application software by transmitting data under a secure communication protocol, and when one matched registered application ID is found, either send the secret data that stored with the matched registered application ID in the same application entry to the registered application software, or encrypt/decrypt data sent from the application using the secret data. The processing module may further comprise a communication interface, for the application software to communicate with an external device.

The application software may communicate with the external device using a secure data transfer protocol. The processing module may further comprise a volatile storage unit for temporarily storing data for the processing unit during operation; the volatile storage unit is able to be configured into two isolate parts: a secure memory unit and a general memory unit.

Preferably, the external device may be a door locking system, a car ignition system, a motorcycle ignition system or a channel control system. The external device may also be a terminal device, a portable device, a laptop computer, a desktop computer, a remote server, an ATM terminal, a smart card reader, a smartphone, or an NFC reader. The application software may send a signal to trigger the external device to perform predetermined actions according to the secret data.

The biometric security device may further comprise a power module, for getting power from the external device. The processing module may be a System on Chip (SoC). The processing module may be a secure cryptoprocessor. The registered application ID may be generated by applying a deterministic, interactable and one-way function to a binary file of the application software. The biometric information may comprise physical biometrics or behavioral biometrics. The physical biometrics may be fingerprint, iris, or face features. The behavioral biometrics may be signature, voice, keystroke dynamics, or gait. The fetched biometric data may be in the form of binary bits. Hardware sliced or time sliced method may be applied to instructions and data stored in the secure execution environment.

The biometric security device with a secure electronic key designed for storing secret data utilizes both TrustZone™ technology (or similar technology) and biometric authentication. Thus, it can provide the flexibility for multiple users or applications to use the biometric security device or any equipment the biometric security device mounted in without compromising the safeguard of the data stored therein. Therefore, the requirement mentioned above can be fulfilled.

DETAILED DESCRIPTION OF THE PREFERRED EMBODIMENTS

The present invention will now be described more specifically with reference to the following embodiments.

Figure 1:
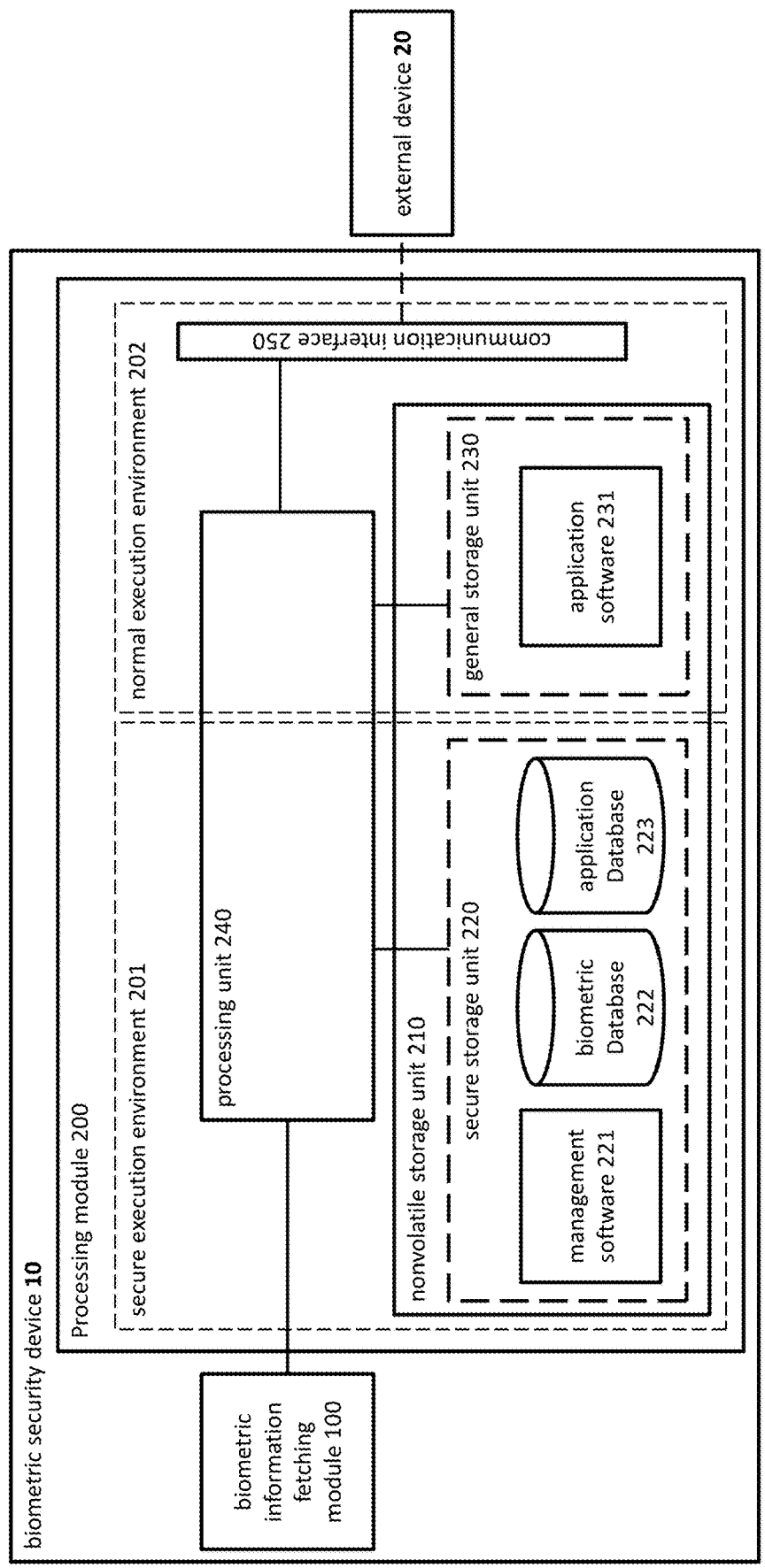
FIG. 1 is a schematic diagram of a biometric security device according to the present invention.

Please refer to FIG. 1. FIG. 1 is a schematic diagram of a biometric security device 10 according to the present invention. The biometric security device 10 includes a biometric information fetching module 100 and a processing module 200. The biometric information fetching module 100 is used to fetch biometric information from a user and convert biometric information into a fetched biometric data. The processing module 200 is able to be configured into two isolated environments, a secure execution environment 201 and a normal execution environment 202, by using hardware sliced or time sliced method so that any instructions and data inside the secure execution environment 201 cannot be directly accessed from the normal execution environment 202 or an external device, they are able to be accessed only via specific routes. The processing module 200 includes a nonvolatile storage unit 210, a processing unit 240, and a communication interface 250. The nonvolatile storage unit 210 is able to be configured into a secure storage unit 220 and a general storage unit 230. Instructions executed in the secure execution environment 201 and data related to those instructions are stored in the secure storage unit 220. A management software 221 is installed in the processing module 200 and is executed in the secure execution environment 201 for managing the biometric information of the user(s) and the information of applications installed in the processing module 200. The instructions of the management software 221 are stored in the secure storage unit 220 in the form of executable codes. A biometric database 222 and an application database 223 are also stored in the secure storage unit 220 as well. The biometric database 222 has a number of biometric entries stored therein, and each biometric entry includes at least one stored biometric data. The application database 223 has a number of application entries stored therein, and each application entry includes a registered application ID (used for an application to register) and a secret data. The stored data are accessed only through the management software 221, so that data stored therein are protected with respect to confidentiality and integrity. The applications installed in the processing module 200 and executed in the normal execution environment 202 are stored in the general storage unit 230. Some of the applications having security concerns are registered in the application database 223 as registered application software 231. The registered application software 231 that works with the management software 221 has a corresponding application ID, i.e., the registered application ID, stored in the application database 223. The registered application ID may be generated by applying a deterministic, intractable and one-way function to the binary file (executable codes) of the application software 231. The one-way function may be a hash function, e.g., MD5, SHA-1, etc. The processing unit 240 is used to execute the management software 221 and the application software 231 installed in the processing module 200, and is electrically linked to the biometric information fetching module 100, the nonvolatile storage unit 210, and the communication interface 250. Other applications may also be executed by the processing unit 240. The biometric information fetching module 100 fetches biometric data from a user and sends the fetched biometric data to the processing module 200. The fetched biometric data is temporarily stored in the secure execution environment 201 in the form of binary bits. The processing module 200 may include a volatile storage unit (not shown) for temporarily storing data for the processing unit 240 during operation. The volatile storage unit is able to be configured into two isolate parts: a secure memory unit and a general memory unit. The secure memory unit is used for temporarily storing data for instructions executed in the secure execution environment 201, e.g., the fetched biometric data. The general memory unit is used for temporarily storing data for application software 231 and other applications executed in the normal execution environment 202. Data transferred between the biometric information fetching module 100 and the processing module 200 may be encrypted to increase the security of the biometric security device 10. The communication interface 250 is used for the application software 231 to communicate with an external device 20. The communication between the application software 231 and the external device 20 may be protected using a secure data transfer protocol. The processing module 200 may be a secure cryptoprocessor. The processing module 200 may also be a System-on-Chip (SoC) based on ARM TrustZone technology or embedded hardware used to support trusted execution environment (TEE) implementations. Using an ARMv8-M process as an example, the specific routes mentioned above are Secure Gateway (SG) instructions stored in a Non-secure callable memory region.

The external device 20 may be a door locking system, a car ignition system, a motorcycle ignition system, a channel control system, a terminal device, a portable device, a laptop computer, a desktop computer, a remote server, an ATM terminal, a smart card reader, a smartphone, or an NFC reader. The communication interface 250 may comply with a specification of SPI, I2C, USB, Lightning, HDMI, NFC, Wi-Fi, etc. Data transferring between the biometric security device 10 and the external device 20 may be encrypted using a secure data transfer protocol. In some circumstance, the processing module 200 may include multiple communication interfaces. The biometric security device 10 may further comprise a power module to getting power from the external device 20 while the communication interface 250 complies with power delivery specification, e.g., USB, Lightning, NFC, etc.

Figure 2:
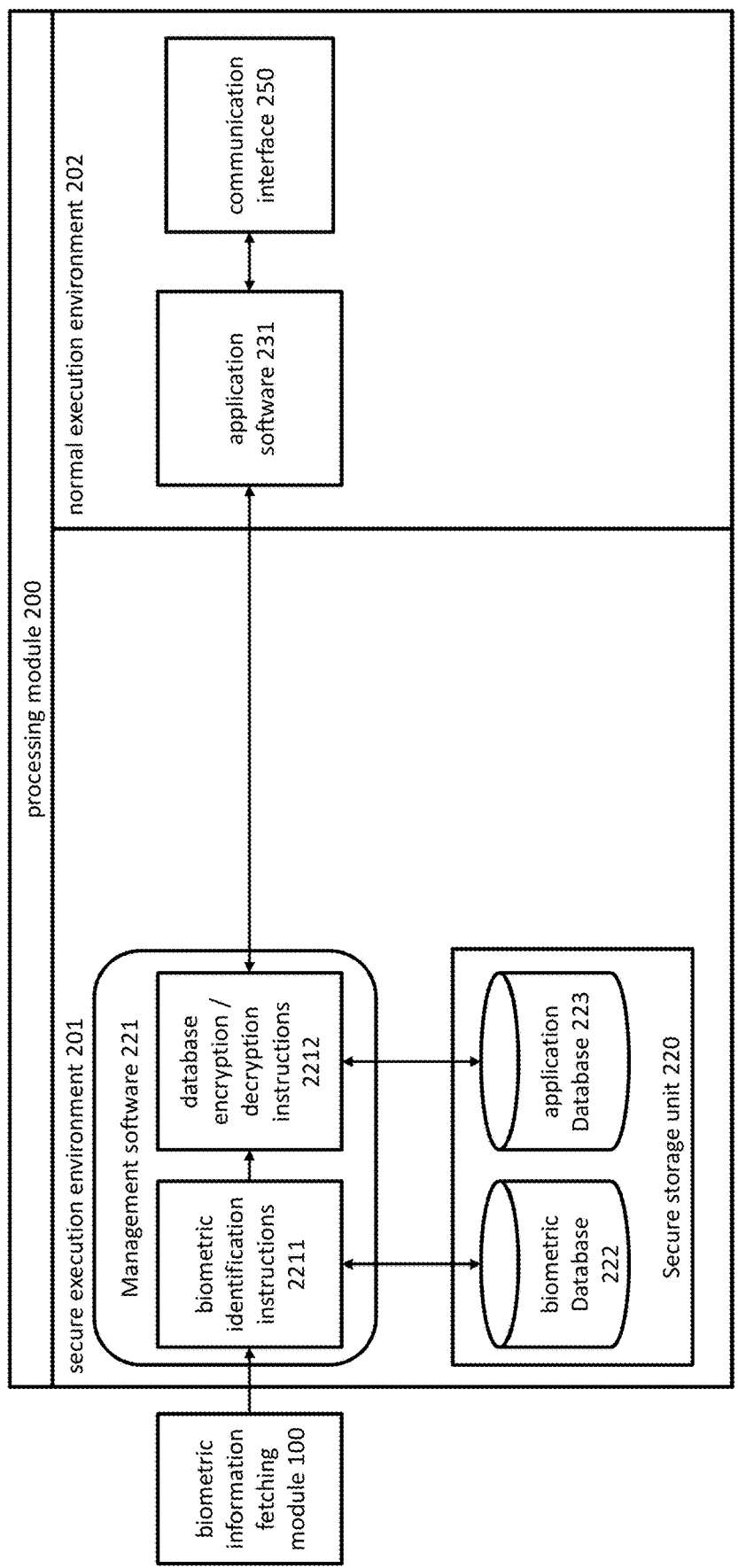
FIG. 2 is a first embodiment of the biometric security device in operation according to the present invention.
Figure 3:
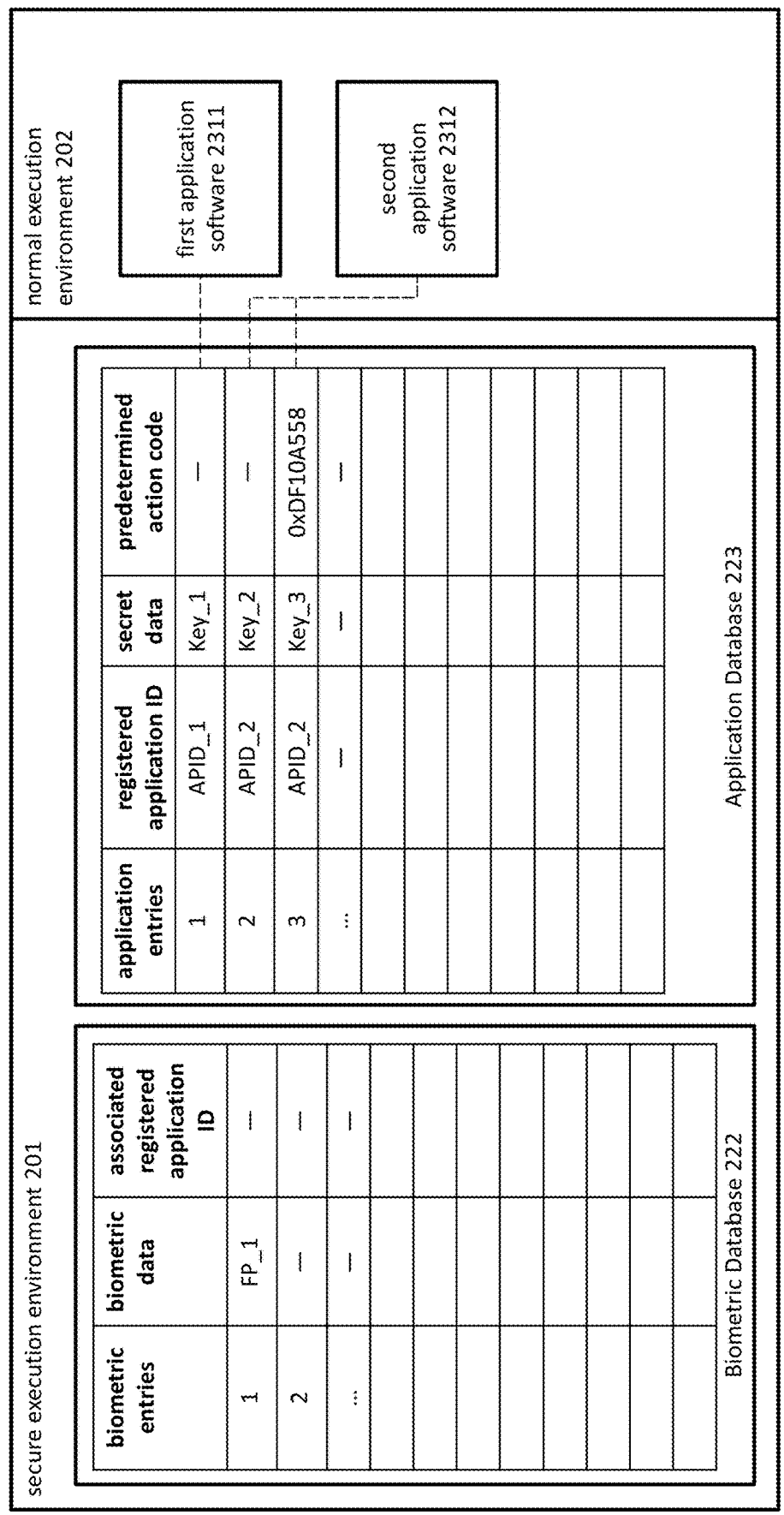
FIG. 3 is the data stored in the biometric security device in the first embodiment according to the present invention.

Please refer to FIG. 2 and FIG. 3 at the same time. FIG. 2 is a first embodiment of the biometric security device 10 in operation according to the present invention, and FIG. 3 is the data stored therein. The management software 221 is executed in the secure execution environment 201. The management software 221 primarily includes biometric identification instructions 2211 and database encryption/decryption instructions 2212. There may be additional instructions (not shown) for handling the user registration process and the application registration process. Once a user is registered, a biometric data is stored in the biometric database 222, and the registered application ID and corresponding secret data of the application software 231 (i.e., the application chosen by the user) are stored in the application database 223. The instructions of the application software 231 stored in the general storage unit 230 are executed in the normal execution environment 202. After that, a registered user may retrieve the secret data when the user is identified. The biometric identification instructions 2211 is used to check whether the fetched biometric data matches one of the stored biometric data. The whole application database 223 or the corresponding portion of the application database 223 is decrypted by the database encryption/decryption instructions 2212 when the fetched biometric data matches one of the stored biometric data. The management software 221 may send the corresponding secret data to the application software 231. Then, the application software 231 may send a signal to trigger the external device 20 to perform predetermined actions according to the secret data. The communication between the management software 221 and the application software 231 may transmit data under a secure communication protocol.

In FIG. 3, a fingerprint data (FP_1) of the user is stored in the biometric database 222, and two application IDs (APID_1 and APID_2) and corresponding secret data (Key_1, Key_2, and Key_3) are stored in the application database 223. APID_1 and APID_2 may be generated by applying SHA-1 to the execute codes of the first application software 2311 and the second application software 2312 respectively. The biometric security device 10 may be a multi-function key. The first application software 2311 may be an application to control an electronic door lock, and Key_1 is a pin code to unlock it. The second application software 2312 may be an application provided by a vehicle company to start a vehicle, and Key_2 is the secret data for the vehicle to verify its owner. Both application software communicate to their counterpart using RF (radio frequency) communication, e.g., Wi-Fi, Bluetooth. In the present embodiment, the whole application Database 223 is encrypted when at least one stored biometric data exists, and will be decrypted while a fetched biometric data matches the stored biometric data (FP_1).

Figure 4:
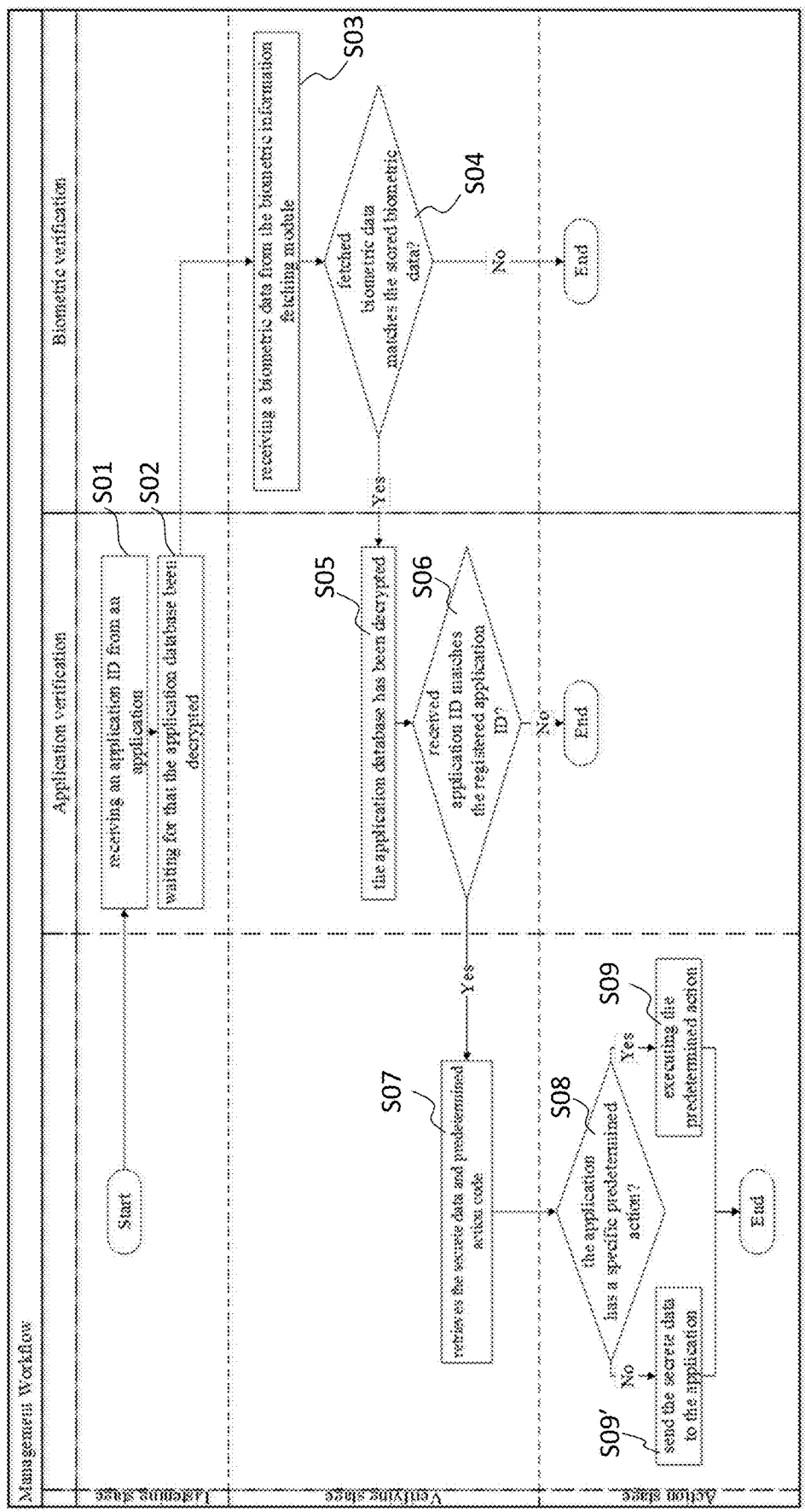
FIG. 4 is a flowchart for the management software to operate the biometric security device in the first embodiment.

Please refer to FIG. 4. FIG. 4 is a flowchart for the management software 211 to operate the biometric security device 10 of the first embodiment. The flowchart shows a first specific route for the application software 231 in the normal execution environment 202 to access the instructions and data inside the secure execution environment 201. The management software 211 receives a request with an application ID from an application software 231 (S01). The application database 223 is encrypted at that moment. Therefore, the management software 211 halts and waits for the application database 223 been decrypted (S02) for a short period of time. The biometric identification instructions 2211 receive a biometric data from the biometric information fetching module 100 (S03), and check if the fetched biometric data matches the stored biometric data (S04). If these two biometric data are matched, the database encryption/decryption instructions 2212 will decrypt the application Database 223 (S05). Then, the database encryption/decryption instructions 2212 searches the received application ID in the application database 223 (S06). If the received application ID matches one application ID in the application entry, the database encryption/decryption instructions 2212 retrieve the secret data and predetermined action code (S07). The database encryption/decryption instructions 2212 checks whether a predetermined action code exists (S08). If the predetermined action code exists in the application Database 223, the database encryption/decryption instructions 2212 follows the predetermined action code to invoke a predetermined action (S09). The predetermined action uses the secret data as authentication information. If no predetermined action code exists in the application Database 223, the database encryption/decryption instructions 2212 send the secret data back to the application software (S09'). The request may contain additional information to match the predetermined action code for multiple actions for one application software. For example, the second application software 2312 in FIG. 3 may contain additional instructions to control the vehicle, and the application entry No. 3 is used to control the door lock of the vehicle. The application entry No. 3 is chosen to respond to the second application software 2312 while the additional information in the request contains the predetermined action code "0xDF10A558". In short, the processing unit 240 executes a predetermined action in response to one corresponding registered application or initiates one registered application when the fetched biometric data matches a specific stored biometric data which is stored with the application ID of said registered application in the biometric entry.

Figure 5:
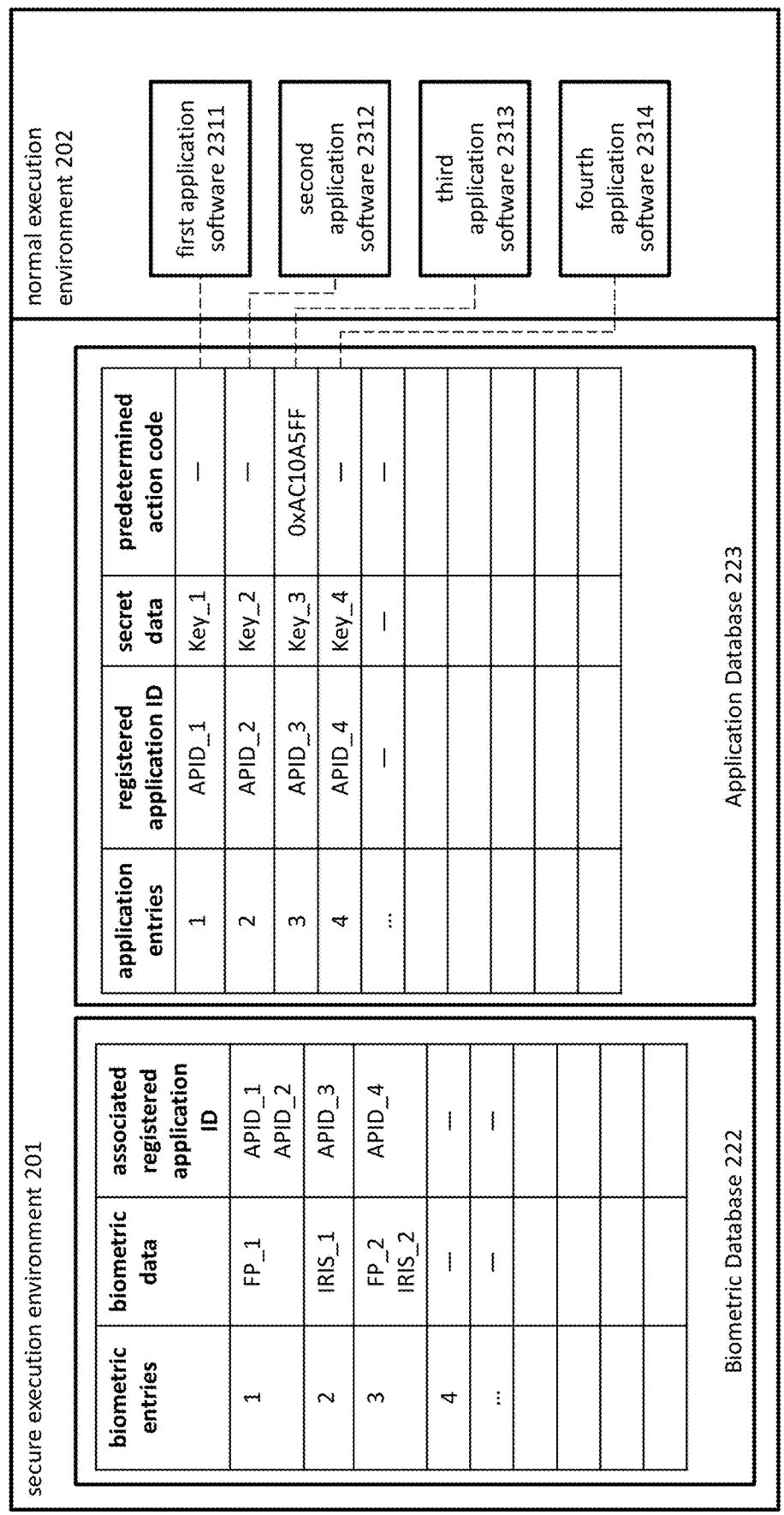
FIG. 5 is the data stored in the biometric security device in a second embodiment.

The biometric entry may include more stored biometric data. The biometric information fetching module 100 may be designed to fetch multiple types of biometric information from a user, or there could be multiple types of the biometric information fetching modules 100 built in the biometric security device 10. In this scenario, the application database 223 is decrypted while all fetched biometric data match all of the stored biometric data in one biometric entry. Please refer to FIG. 5. FIG. 5 is the data stored in the biometric security device 10 in the second embodiment. The biometric security device 10 may be an optical head-mounted display with two biometric sensors: an iris scanner and a fingerprint sensor. In this embodiment, a first application software 2311, a second application software 2312, a third application software 2313 and a fourth application software 2314 are executed in the normal execution environment 202, and four corresponding application entries are stored in the application database 223. Three biometric entries are stored in the biometric database 222. The first biometric entry contains a first fingerprint data (FP_1), and the first and second application entries are encrypted using the first fingerprint data. The second biometric entry contains a first iris data (IRIS_1), and the third application entry is encrypted using the first iris data. The third biometric entry contains a second fingerprint data (FP_2) and a second iris data (IRIS_2). The fourth application entry is encrypted using both the second fingerprint data (FP_2) and the second iris data (IRIS_2), and can be decrypted when both fetched biometric data match the stored biometric data (fetched fingerprint data matches PF_2 and fetched iris matches data IRIS_2). Hash functions may be used to map different size of the biometric data to data of fixed size while encryption involves various types of the biometric data. The associated registered application ID(s) stored in the biometric database 222 are used to indicate the application entries that are encrypted using the biometric data. The associated registered application ID (APID_3) stored within the biometric entry also may be used to indicate the application software (the third application software 2313) to be invoked while a predetermined action code ("0xAC10A5FF") exists in the application database 223. For example, the third application software 2313 may be a Mixed Reality (MR) or Augmented Reality (AR) application, and the third application software 2313 will be executed automatically when a registered user, who registers using his/her iris data IRIS_1, put on the biometric security device 10. The process to execute the third application software 2313 will be described in the later paragraph. The fourth application software 2314 may be an online banking software that additional security requirement is needed. The fourth secret data (Key_4) may be account information or a PIN code of the registered user's account, and can be retrieved when both fetched biometric data match the corresponding stored biometric data. In the present embodiment, a portion of the application database is encrypted when at least one stored biometric data exists, and is decrypted when the fetched biometric data matches any one of the stored biometric data. Furthermore, a portion of the application database is associated with one of the biometric entry and the portion of the application database is decrypted when the fetched biometric data matches the stored biometric data of the biometric entry.

Figure 6:
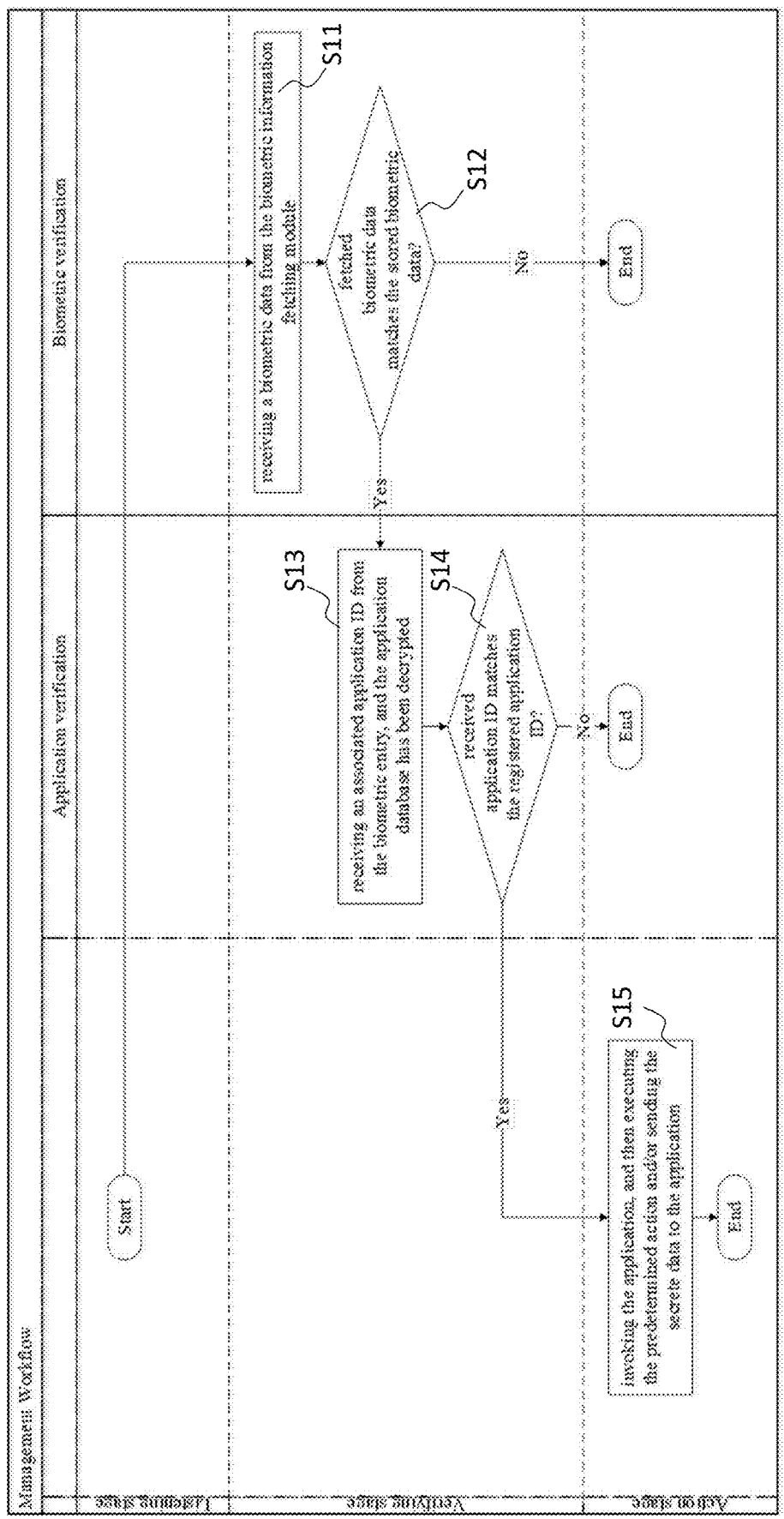
FIG. 6 shows another flowchart for the management software to operate the biometric security device in the second embodiment.

Please refer to FIG. 6. FIG. 6 is another flowchart for the management software 221 to operate the biometric security device 10 in the second embodiment. The second biometric entry and the third application entry are used as an example. The flowchart shows a second specific route for the application software 231 in the normal execution environment 202 to access the instructions and data inside the secure execution environment 201. First, the biometric identification instructions 2211 in the management software 211 receive a fetched biometric data from the biometric information fetching module 100 (S11), and check if the fetched biometric data matches the stored biometric data (S12). If these two biometric data are matched, the database encryption/decryption instructions 2212 will receive the corresponding associated registered application ID and decrypt the corresponding portion of the application Database 223 (S13). Then, the database encryption/decryption instructions 2212 checks if the received associated registered application ID matches the application ID(s) stored in the application database 223 (S14). If one application ID in the application entry matches the received associated registered application ID, the database encryption/decryption instructions 2212 retrieves the secret data and predetermined action code. The management software 211 then invokes the application associated with the application ID, executes the predetermined action and/or sends the secret data to the application (S15). In the previous paragraph, the biometric identification instructions 2211 checks if a fetched iris data matches the stored iris data. Assuming that the fetched iris data matches IRIS_1, then APID_3 is received by the database encryption/decryption instructions 2212. The database encryption/decryption instructions 2212 decrypt the corresponding portion of the application database 223 (only application entry 3 in this example) and find a match. After that, the database encryption/decryption instructions 2212 retrieve a secret data (Key_3) and a predetermined action code ("0xAC10A5FF"). In the final step, the management software 211 invokes the third application software 2313 and initiates a preset personal configuration for the user (according to the predetermined action code), and sends the secret data (Key_3) to the third application software 2313 (e.g., to log in the user's account online).

Figure 7:
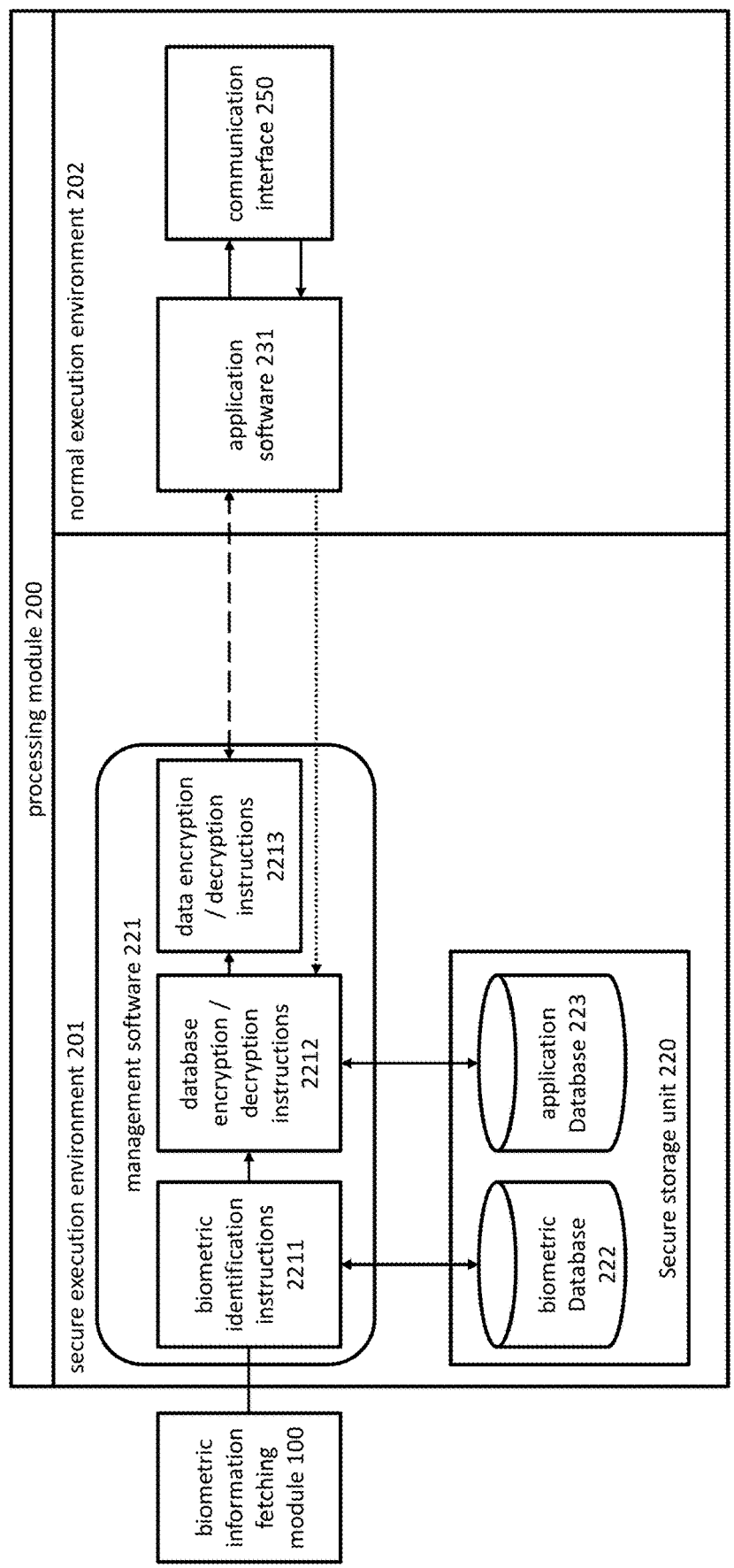
FIG. 7 is a third embodiment of the biometric security device in operation according to the present invention.
Figure 8:
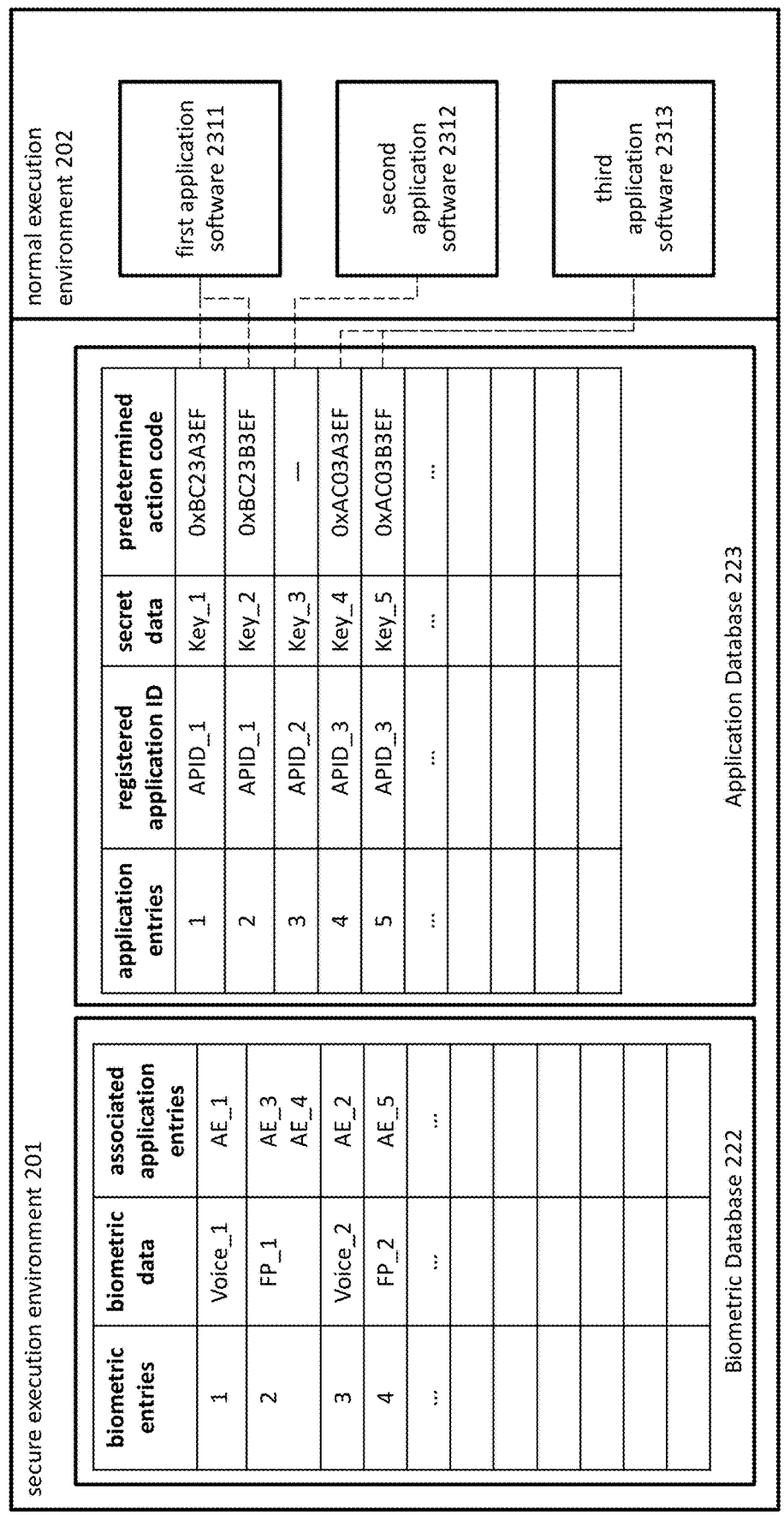
FIG. 8 is the data stored in the biometric security device in the third embodiment.

Please refer to FIG. 7 and FIG. 8 at the same time. FIG. 7 is a third embodiment of the biometric security device 10 in operation according to the present invention, and FIG. 8 is the data stored therein. The biometric information in the third embodiment may comprise physical biometrics and/or behavioral biometrics. The physical biometrics may be fingerprint, iris, or face features. The behavioral biometrics may be signature, voice, keystroke dynamics, or gait. The management software 221 may further include data encryption/decryption instructions 2213. The biometric security device 10 may be a home automation device with two biometric information fetching module: a fingerprint scanner and a microphone. The management software 221 may include voice command functions, and the biometric identification instructions 221 may include speaker recognition and fingerprint identification functions. The application software 231 may be a client application of a streaming service or instant messaging software. The data encryption/decryption instructions 2213 may decrypt the streaming media to provide content protection to the media provider. The data encryption/decryption instructions 2213 may decrypt/encrypt the messages sent/received by the instant messaging software to provide privacy to the user. The secret data may be a private key of asymmetrical cryptography. For example, the first application software 2311 is the media player application provided by a streaming provider, the second application software 2312 is a client software of an online payment service, and the third application software 2313 is a door security software of an electronic home security system. The first biometric entries contain a first speaker recognition data (Voice_1) of a parent in a family and a list of associated application entries (AE_1). The second biometric entries contain a first fingerprint data (FP_1) of the parent and a list of associated application entries (AE_3 and AE_4). The third and fourth biometric entries contain a second speaker recognition data (Voice_2) and a second fingerprint data (FP_2) of a child in a family respectively. Unlike the previous embodiment that the associated registered application ID(s) are stored in the biometric database 222, a list of associated application entries is stored within each biometric entry to indicate the application entries encrypted using the biometric data in the present embodiment. Both speaker recognition data are able to be used to access the first application software 2311. But, different speaker recognition data has different preset configuration of the programs. The first application software 2311 uses the predetermined action codes to distinguish between users. The secret data is used only for the data encryption/decryption instructions 2213 to encrypt/decrypt data sent from the application software 231. Therefore, the secret data would never leave the secure execution environment 201. The second speaker recognition data (Voice_2) gives the user (child) limited access to the programs that follow television content rating systems. The first speaker recognition data (Voice_1) gives the user (parent) full access to the programs he/she paid. The second application software 2312 is an application for an online payment service. The third application software 2313 is an application to control an electronic door lock. The method to operate the second application software 2312 and the third application software 2313 are described in the previous embodiments, and will not be repeated here. There may be more application software exist in the biometric security device 10.

Figure 9:
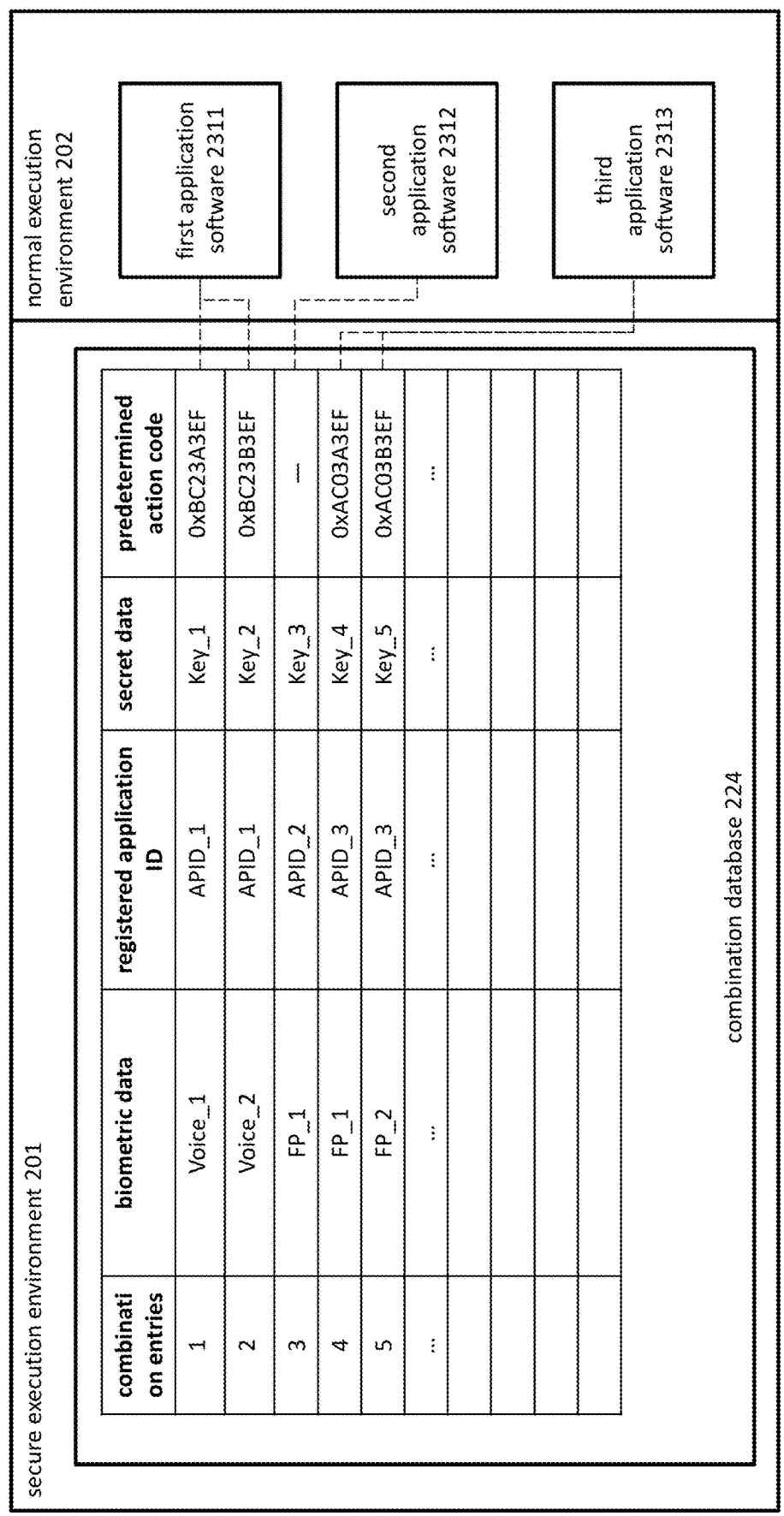
FIG. 9 is the data stored in the biometric security device in a fourth embodiment.

Please refer to FIG. 9. FIG. 9 is the data stored in a fourth embodiment of the biometric security device 10. The difference between the present embodiment and the previous one is that the biometric database 222 and the application database 223 are combined into one database, e.g., the combination database 224. The secrets are encrypted using the corresponding biometric data, and the whole combination database 224 may be encrypted using a device encryption key (not shown) or a unique device-specific key generated by a physically unclonable function.

The biometric security device 10 works as a safe deposit box to protect a secret data by utilizing a biometric data to encrypt a secret data. The processing module 200 that is configured into two isolate environments enhances the safety of the biometric data and the secret data, and the application software 231 executed therein provides flexibility of the registration and authentication process for developers to establish communication channels between the biometric security device 10 and various external devices 20.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A biometric security device, comprising: a biometric information fetching module comprising logic configured for fetching biometric information and converting biometric information into a fetched biometric data: and a processing module, having a management software installed therein, configured into two isolated environments: a secure execution environment and a normal execution environment; any instructions and data stored in the secure execution environment can not be directly accessed from the normal environment or an external device; the processing module comprises: a nonvolatile storage unit, configured into:

a secure storage unit, including a biometric database, an application database and instructions of the management software; the biometric database has a plurality of biometric entries; each biometric entry comprises at least one stored biometric data; the application database has a plurality of application entries; each application entry comprises a registered application ID and a secret data; the stored data are accessed only through the management software; and a general storage unit, having a registered application software stored therein, wherein each of the registered application software has a corresponding registered application ID; and a processing unit, electrically linked to the biometric information fetching module and the nonvolatile storage unit;

wherein the management software is executed in the secure execution environment to check if the fetched biometric data matches one of the stored biometric data; the fetched biometric data is stored in the secure execution environment; the whole or a portion of the application database is encrypted when at least one stored biometric data exists, and is decrypted when the fetched biometric data matches any one of the stored biometric data.

2. The biometric security device according to claim 1, wherein the secret data and a predetermined action code is retrieved from the application database when the fetched biometric data matches any one of the stored biometric data and an application ID received by the management software matches any one of the registered application ID in the application database, and a predetermined action is invoked according to the predetermined action code.

3. The biometric security device according to claim 1, wherein the biometric entry further comprises an associated registered application ID or an associated application entry of one registered application.

4. The biometric security device according to claim 3, wherein the secret data and a predetermined action code is retrieved from the application database when the fetched biometric data matches a specific stored biometric data which is stored with the associated registered application ID or the associated application entry of said registered application in the biometric entry, and a predetermined action is executed according to the predetermined action code.

5. The biometric security device according to claim 1, wherein a portion of the application database is associated with one of the biometric entries and the portion of the application database is decrypted when the fetched biometric data matches the stored biometric data of the biometric entry.

6. The biometric security device according to claim 1, wherein data is transmitted under a secure communication protocol between the management software and the application software, and when one matched registered application ID is found, either the secret data stored with the matched registered application ID in the same application entry is sent to the registered application software, or data sent from the application is encrypt/decrypt using the secret data.

7. The biometric security device according to claim 1, the processing module further comprises a communication interface, for the application software to communicate with the external device.

8. The biometric security device according to claim 7, wherein the application software communicates with the external device using a secure data transfer protocol.

9. The biometric security device according to claim 1, wherein the processing module further comprises a volatile storage unit for temporarily storing data for the processing unit during operation; the volatile storage unit is configured into two isolate parts: a secure memory unit and a general memory unit.

10. The biometric security device according to claim 8, wherein the external device is a door locking system, a car ignition system, a motorcycle ignition system or a channel control system.

11. The biometric security device according to claim 8, wherein the external device is a terminal device, a portable device, a laptop computer, a desktop computer, a remote server, an ATM terminal, a smart card reader, a smartphone, or an NFC reader.

12. The biometric security device according to claim 8, wherein the application software sends a signal to trigger the external device to perform predetermined actions according to the secret data.

13. The biometric security device according to claim 7, further comprising a power module, wherein power is provided from the external device to the biometric security device by the power module while the communication interface complies with power delivery specification.

14. The biometric security device according to claim 1, wherein the processing module is a System on Chip (SoC).

15. The biometric security device according to claim 1, wherein the processing module is a secure cryptoprocessor.

16. The biometric security device according to claim 1, wherein the registered application ID is generated by applying a deterministic, interactable and one-way function to a binary file of the application software.

17. The biometric security device according to claim 1, wherein the biometric information comprises physical biometrics or behavioral biometrics.

18. The biometric security device according to claim 17, wherein the physical biometrics is fingerprint, iris, or face features.

19. The biometric security device according to claim 17, wherein the behavioral biometrics is signature, voice, keystroke dynamics, or gait.

20. The biometric security device according to claim 1, wherein the fetched biometric data is in the form of binary bits.

21. The biometric security device according to claim 1, wherein hardware sliced or time sliced method is applied to instructions and data stored in the secure execution environment.

* * * * *